United States Patent [19]

Russell

[11] 4,183,142
[45] Jan. 15, 1980

[54] SELF-RETRACTING MEASURING DEVICE WITH WIPING SYSTEM FOR OIL SUMPS AND OTHER CONTAINERS

[76] Inventor: James R. Russell, Apt. 401 - 214 Agnes St., New Westminster, British Columbia, Canada, V3L 1E6

[21] Appl. No.: 908,737

[22] Filed: May 23, 1978

[30] Foreign Application Priority Data

Nov. 23, 1977 [CA] Canada .................................. 291603

[51] Int. Cl.² ............................................. G01F 23/04
[52] U.S. Cl. .................. 33/126.7 R; 242/107
[58] Field of Search .................. 33/127.7 R, 127.7 A, 33/126, 126.6; 242/107; 15/210 B

[56] References Cited

U.S. PATENT DOCUMENTS

| | | | |
|---|---|---|---|
| 280,586 | 7/1883 | David | 33/126.7 R |
| 1,103,816 | 7/1914 | Newhouse | 242/107 |
| 1,857,334 | 5/1932 | Rubert | 33/126.7 R |
| 2,755,772 | 7/1956 | Palmer | 242/107 X |
| 3,311,984 | 4/1967 | Stux et al. | 33/126.7 R |

*Primary Examiner*—William D. Martin, Jr.

[57] ABSTRACT

A device for measuring the oil or fluid level in engine sumps or other containers is known to consist of a removable dipstick marked with a scale and equipped with an extraction handle, riding freely longitudinally in a tube leading to the outside, so that the oil or fluid level may be read on the scale when the dipstick is extracted. In this invention, the dipstick is self-retracting, being the outer end of a coil spring of suitable length and tension, its outer end straightened for a suitable length, marked with a scale, led outside through the tube, and equipped with a handle which may be detachable for disassembly, the inner end of the coil secured to an arbor, such arbor immobilized between guide plates or discs, the spring being free to tighten around the arbor when the straight portion is extracted, but exerting sufficient tension to expand and retract the straight portion when the extraction tension is removed. Alternatively, the measuring part may be a measuring blade of suitable dimensions linked for flexibility to the outer end of the coil spring, or the straight portion may be reinforced with a metal strip along its length.

The straight portion or measuring blade passes freely through the tube between two wiping pads of felt or other suitable material, one fixed, the other movable by external pressure through an aperture in the tube, pressure being applied to the movable pad when required to compress the straight portion or blade against the fixed pad to clean it of oil or fluid while it is being extracted, a light spring returning the movable pad to its original position when the external pressure is removed, with sufficient clearance so that the straight part or blade will not again be wiped when retracted and re-extracted to show on the scale the oil or fluid level inside the sump or container.

4 Claims, 3 Drawing Figures

SELF-RETRACTING MEASURING DEVICE WITH WIPING SYSTEM FOR OIL SUMPS AND OTHER CONTAINERS

This invention relates to a device for measuring the oil levels in the sumps of internal combustion engines or the fluid levels in transmission housings of automobiles or other containers.

Dipsticks in common use consist of narrow flat strips of metal marked with scales at their lower ends to show oil or fluid levels in sumps or containers when extracted by an external handle. Such dipsticks are completely separate from such sumps or containers, and when extracted, are wiped with a rag, re-inserted into the sump or container to allow the oil or fluid level to register on the scale, re-extracted so that the level may be read, and re-inserted - a total of five operations during which foreign matter may be introduced into the sump through the tube and during which it is often difficult to locate the entry hole at the outer end of the tube.

I have found these difficulties may be overcome and the measuring device made self-retracting by using the straightened outer end of a coil spring, equipped with a scale, as a measuring device.

The straightened portion may be reinforced with a flat metal strip attached along its length, or may be replaced with a measuring blade of suitable length and width, connected to the outer end of the spring through a link, to provide flexibility, and led to the outside through the tube and equipped with a handle, which may be detachable, the inner end of the spring being attached to an arbor, itself immobilized between guide plates immersed in the oil or fluid, its coils being free to tighten around the arbor when the straight portion is extracted and of sufficient strength to expand when the extractive tension is removed to retract the straight portion into the sump to a limit of travel imposed by the handle or an external cap for the tube fitted to the handle.

In the form shown herewith the measuring part is ametal reinforcing strip attached to the straightened end of the spring.

Within the tube, the straight portion of the spring passes freely between two wiping pads, one affixed to the internal surface of the tube, the other a movable one opposite it, attached to a strip of light flat spring which is attached to the exterior of the tube, the movable pad positioned so as to enter an aperture in the tube when pressed by finger pressure from the exterior and capable of compressing the straight portion against the fixed pad and wiping it clean of oil or fluid while it is being extracted from the sump.

The flat strip of spring attached to the movable pad is capable of lifting it clear of the straight portion of the measuring device when external pressure is removed, to provide sufficient clearance so that the straight portion will not again be wiped while being retracted into the sump and re-extracted to show the oil or fluid level on the scale.

In drawings which illustrate embodiments of this invention,

Figure 1:
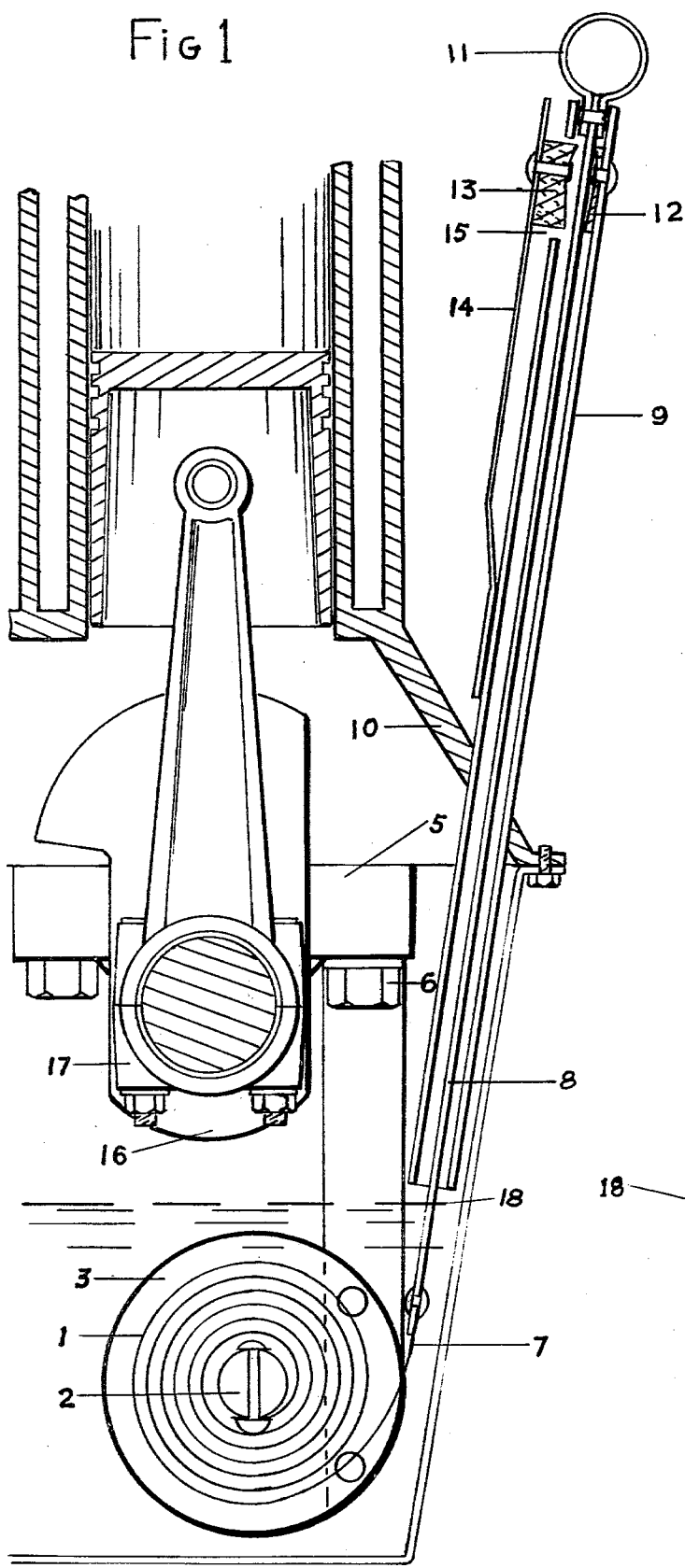
FIG. 1 is a cutaway view, partly in section, of the inside of the crankcase of an internal combustion engine, showing a side view in section of an embodiment of the invention.

The device illustrated comprises a coil spring 1, its inner end riveted to an arbor 2 separating two guide discs 3, one of which is attached by a bracket 4 to a main bearing cap 5 by the bearing nut or bolt 6. The outer end of the spring 7 is reinforced by a narrow flat strip 8, riveted to it along its length, both extending through the tube 9 to a point outside the cylinder block and terminating in a loop handle 11 at the outer end of the tube.

A wiping pad is 12 riveted to the interior surface of the tube, opposite a second wiping pad 13 riveted to a length of flat spring 14, whose lower end is attached to the exterior of the tube. The wiping pad 13 is positioned in an aperture 15 in the tube so that it may be pressed into the tube by finger pressure against 7 and 8, compressing them against the pad 12 to provide a wiping system for 7 and 8 to clean them or oil or fluid when they are being extracted from the sump. Relaxation of the finger pressure on the spring 14 allows the pad 13 to back away from the strips 7 and 8 with sufficient clearance to prevent them from again being wiped when retracted and re-extracted from the sump, to allow the oil or fluid level to register on the scale.

Figure 2:
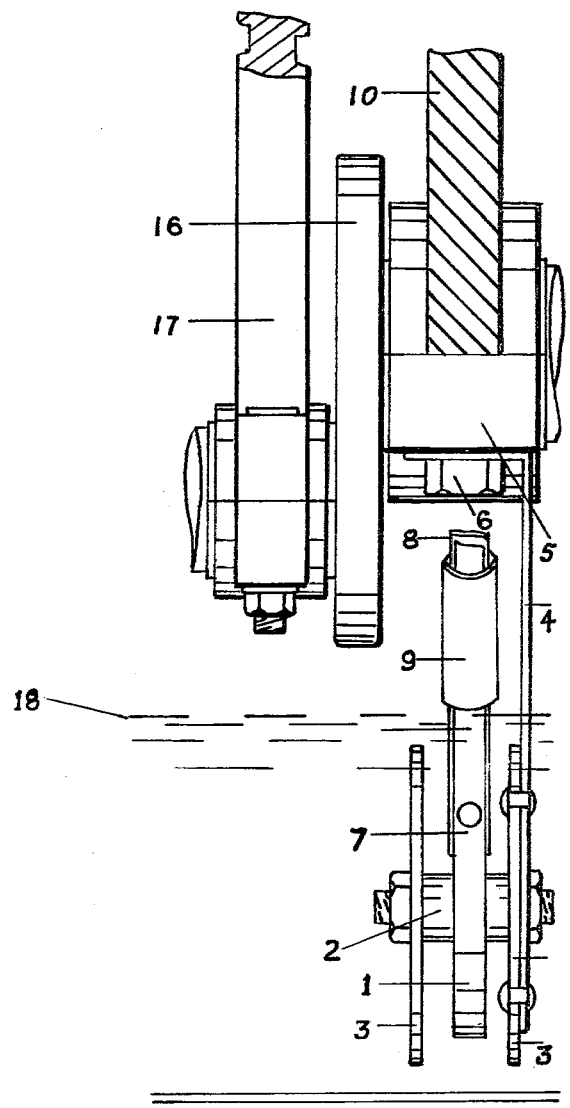
FIG. 2 is an end view showing the device attached to a main bearing cap of an engine by the cap nut or bolt, illustrating clearance from the crankshaft throw and the large end of a connecting-rod.
Figure 1A:
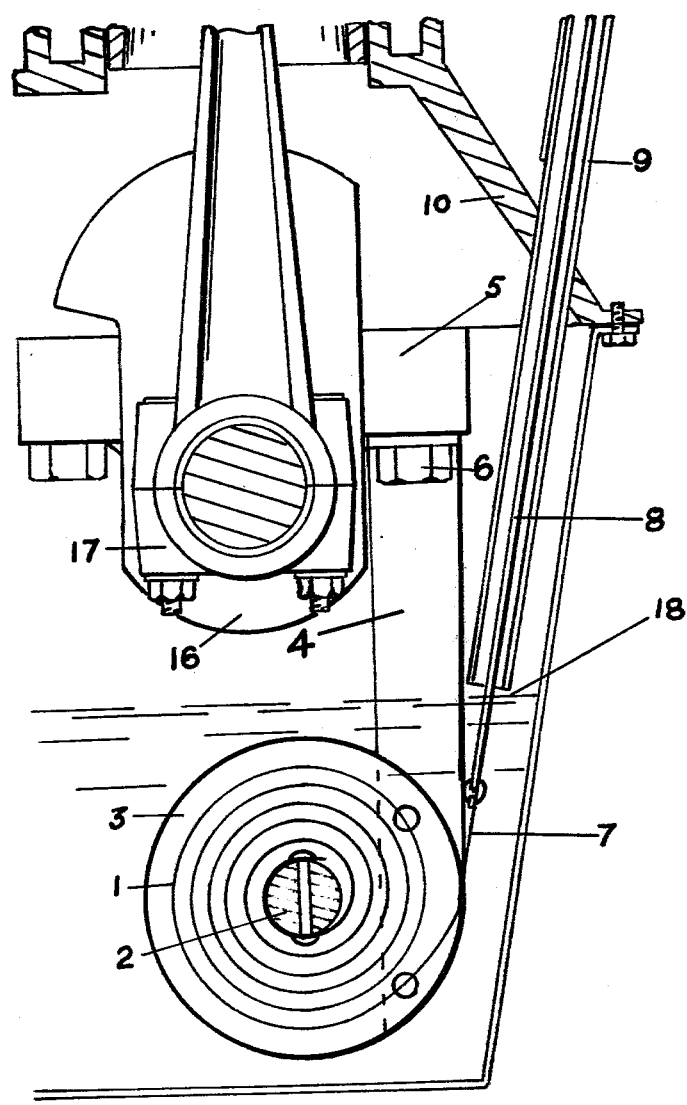

FIG. 2 shows positioning of the guides and coil spring sufficiently low in the crankcase to provide ample clearance from the crankshaft throw, 16, and connecting-rod big end, 17, of the engine, with the guides 3, the coil spring 1, and the lower ends of parts 7 and 8 immersed in the oil, whose level is indicated by the dotted line 18.

The embodiments of the invention in which an exclusive privilege or property is claimed are defined as follows: I therefore claim:

1. A device for measuring the level of oil in an engine sump of the fluid level in any other container of the type incorporating a dipstick containing tube or port leading to the exterior, comprising: a length of flat spring material in the configuration of a flat coil spring, its outer end straightened for a suitable length to act as a measuring unit, marked with a measuring scale, led to the exterior of such sump or container through such tube or port and capable of moving freely longitudinally through such tube or port; a handle attachable to such straightened outer end to extract such portion from such sump or container when required; a base structure comprising two parallel flat guide plates separated by an arbor immobilized between them by attachment of its ends to approximately their centres; a bracket attachable to one or both guide plates to immobilize them and attach them to an engine component within such sump or to the floor or side of such other container; the inner end of such coil spring affixed to the circumference of such arbor perpendicularly to the axis of such arbor between such guide plates, such coil spring coiling loosely around such arbor and being loosely contained between such guide plates, such guide plates, coil spring and measuring portion of such spring so positioned by such bracket as to be immersed in the oil of fluid in such sump or container, such coil spring acting to tighten around such arbor when such straight portion is withdrawn from such sump or container by such handle, and exerting sufficient tension to retract such straight portion into such sump or container when extractive tension is removed; together with a system for wiping oil or fluid from such straight portion when required, comprising two wiping pads of soft material positioned so as to address themselves to the flat surfaces of such straight portion, one pad being in a fixed position, the other movable and positioned opposite the fixed pad, movable against a light spring and acting so that the flat surfaces of such straight portion may be compressed between such pads at will be pressure on the movable pad, such light spring capable of removing the movable pad away from the surface of the straight portion to which it is addressed when pressure on the movable pad is removed.

2. A measuring device as defined in claim 1, in which the straight portion of such coil spring is reinforced by a strip of metal or other material of suitable length and width, affixed along its length.

3. A measuring device as defined in claim 1, in which a narrow, flat measuring blade of suitable dimensions, marked with a scale, is attached through a link to the outer end of such coil spring, and led through such tube to the exterior to act as a measuring instrument.

4. A wiping device as defined in claim 1, in which one wiping pad is secured to the interior of such tube, the other positioned opposite it, secured to a flat spring attached to the exterior of such tube, or centred within a spiral spring affixed to the external tube wall, capable of movement through an aperture in the tube wall, to compress by external pressure such straight portion or blade against such fixed pad, acting so as to wipe such straight portion or blade clean of oil or fluid when extracted by such handle as required, but normally providing sufficient clearance between such movable pad and such straight portion or blade so as not to wipe it when such straight portion or blade is extracted from such sump or container to read the oil or fluid level in such sump or container by the trace left by such oil or fluid on such scale.

* * * * *